S. S. TODD.
MINNOW TRAP.
APPLICATION FILED MAR. 29, 1909.
951,157.
Patented Mar. 8, 1910.
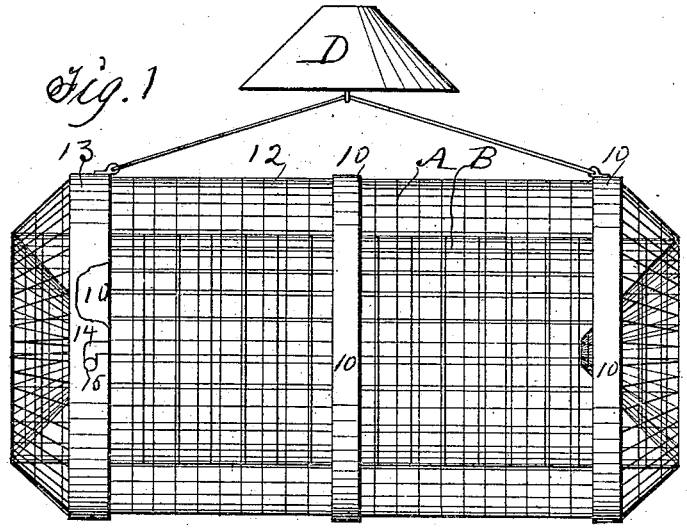
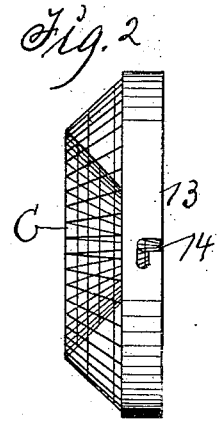
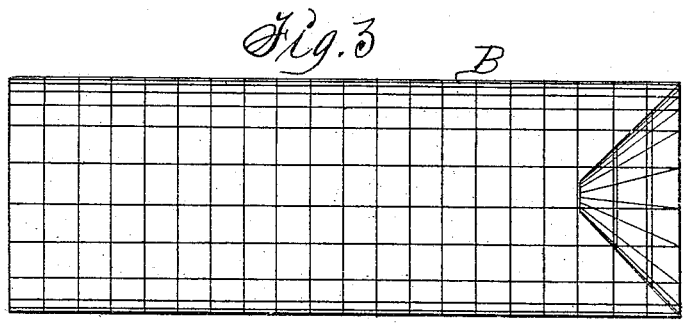
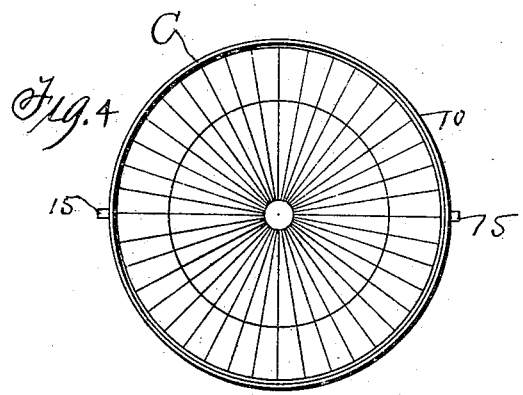
Witnesses:
Erle W. Miller
Harry C. Berkey
Inventor: Samuel S. Todd,
By Thomas G. Orwig & Co.
Attorneys

UNITED STATES PATENT OFFICE.

SAMUEL S. TODD, OF SUTHERLAND, IOWA.

MINNOW-TRAP.

951,157.  Specification of Letters Patent.  Patented Mar. 8, 1910.

Application filed March 29, 1909. Serial No. 486,599.

*To all whom it may concern:*

Be it known that I, SAMUEL S. TODD, a citizen of the United States, residing at Sutherland, in the county of O'Brien and State of Iowa, have invented a new and useful Minnow-Trap, of which the following is a specification.

The object of my invention is to provide a simple, cheap, efficient and durable trap specially adapted to be retained in water to catch minnows differing in size and to separate those too small for use from the larger ones in such a manner that the small ones can be readily replaced in the water and not destroyed and the larger ones placed in a can to be used for bait for catching larger fish.

My invention consists in the structure hereinafter set forth, pointed out in my claim and illustrated in the accompanying drawing in which:

Figure 1 shows two concentric cylinders and a float over the top for buoying them in water. Fig. 2 shows a cover for jointly closing the cylinders at one end as shown in Fig. 1. Fig. 3 shows the inner cylinder open at one end. Fig. 4 is an inside view of the removable cover shown in Fig. 2.

The letter A designates the outer cylinder and B the inner cylinder adapted to be inclosed and retained in the cylinder A as shown in Fig. 1.

The cylinder A is composed of metal bands, 10, of uniform diameter that may vary in size as desired and woven wire, 12, in which the meshes may differ in size as required for catching minnows that differ in size. The inner cylinder B is intended for catching minnows large enough to be used for bait with which to catch larger fish by means of hook and line in a common way.

One end of the cylinder A is open and the cover C shown in Fig. 2 is adapted for detachably closing it. The cover is composed of a metal band 13 that has angular notches 14 adapted to admit fixed studs 15 that project outward from the band 10 at the open end of the cylinder A as shown in Figs. 1 and 4 and the combination with the notches 14 to produce bayonet couplings for detachably fastening the cover for jointly closing the ends of both the cylinders A and B as shown in Fig. 1.

A float D is connected with the cylinder A, as shown in Fig. 1, or in any suitable way as required for buoying the trap in the water.

The inner cylinder B composed of woven wire is open at one end and the wire bent inward at the other end to produce a funnel-shaped extension inward as shown in Fig. 3 and that will engage the inward extension of wires of the outer cylinder A as shown in Fig. 1 and as required to retain the minnows that enter the inner cylinders and to prevent crawfish and other destroyers from entering the cylinders.

The mesh of the wire in the outside cylinder is finer than the inside cylinder to prevent the escape of minnows that are large enough for use.

It is obvious the weight of the trap will retain it in water of different depths and the float prevent it from sinking and lodging on the ground.

Having thus set forth my invention and the manner of its construction the practical operation and utility thereof will be obvious.

What I claim as new and desire to secure by Letters-Patent, is:

A minnow trap comprising a cylindrical cage open at one end and composed of woven wire, a removable cover for the open end and a second concentric cylinder composed of woven wire and open at one end, combined to operate as set forth and means to detachably fasten the removable cover for jointly closing the open ends of the two concentric cylindrical cages.

SAMUEL S. TODD.

Witnesses:
T. B. BARK,
HY. M. MASTER.